(No Model.)
R. CAMPBELL.
CHURN.
No. 434,318. Patented Aug. 12, 1890.
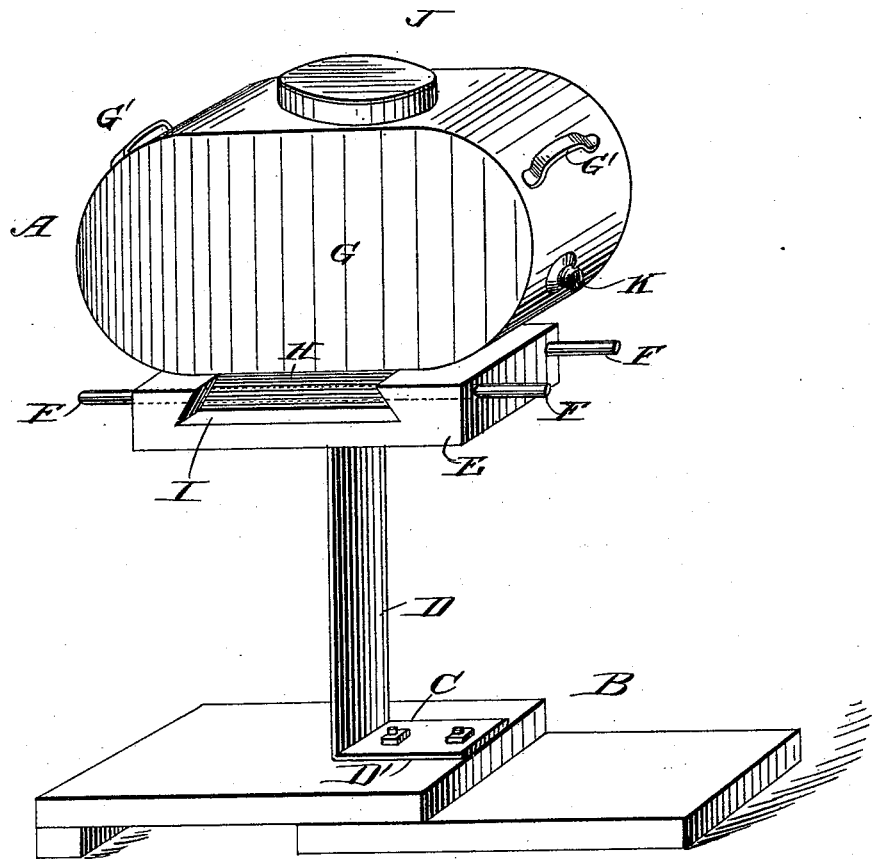
WITNESSES:
INVENTOR:
R. Campbell
BY
ATTORNEYS

UNITED STATES PATENT OFFICE.

ROBERT CAMPBELL, OF MANCELONA, MICHIGAN.

CHURN.

SPECIFICATION forming part of Letters Patent No. 434,318, dated August 12, 1890.

Application filed December 6, 1889. Serial No. 332,776. (No model.)

*To all whom it may concern:*

Be it known that I, ROBERT CAMPBELL, of Mancelona, in the county of Antrim and State of Michigan, have invented a new and Improved Churn, of which the following is a full, clear, and exact description.

The object of the invention is to provide a new and improved churn which is simple and durable in construction, very effective in operation, quickly churns the cream into butter, and produces a product having a perfect grain.

The invention consists of certain parts and details and combinations of the same, as will be described hereinafter, and then pointed out in the claims.

Reference is to be had to the accompanying drawing, forming a part of this specification, in which the figure represents a perspective view of the improvement.

The improved churn A is provided with a suitable base B, preferably made of two parts, so as to be convenient in shipping. On the base B is secured, by bolts C or other means, an arm D', formed at right angles to a vertical spring-plate D, carrying at its upper end an arm similar to the arm D', on which is fastened the support E, extending horizontally, and carrying on its top a vessel G, in which the cream to be churned is placed.

In order to hold the vessel G conveniently in place on the support or platform E, the vessel is provided with a dovetail H, which fits into a corresponding dovetailed groove I, formed in the top of the support E and extending transversely. One or more pins F are adapted to pass longitudinally through the support E and the dovetail H to lock the vessel G in place on the support. The vessel G is preferably made in the shape of a wash-boiler placed on one side, as is plainly illustrated in the figure, and is provided with handles G', to be taken hold of by the operator.

On the top of the vessel G is secured a cap J, which, when removed, permits of filling the vessel with the cream, and which also serves to remove the butter when churned. On one end, near the bottom of the vessel, is secured a screw-cap K for emptying the buttermilk after the butter has been churned and washed.

The operation is as follows: The apparatus is set up in the position shown in the drawing, and the cream to be churned is placed in the vessel G, the cap J is again closed, and the operator preferably seats himself near the churn with his feet resting on the base B. The operator then takes hold of one of the handles G' and pulls the vessel G and the support E toward himself, so as to bend the spring-plate D. When the operator has moved the vessel and the support E sufficiently in one direction, he releases the pressure on the handle, so that the spring-plate D rebounds, whereby the cream in the vessel G receives a concussion. Then the operation is repeated at the rate of about one hundred and twenty strokes a minute, so that the several concussions churn the cream into butter. After the butter has gathered, the operator repeats the above-described operation very rapidly for a few seconds, so as to prevent the butter from massing and keeping the grain separate. The butter usually requires two washings, the device being operated for this purpose very rapidly a few seconds.

It will be seen that the entire apparatus is very simple in construction, easily operated, and very effectively and quickly churns the cream into butter. The vessel G can be removed from the support E by moving it transversely in order to clean said vessel or for other purposes.

The grain of the butter produced by this churn is always perfect, and the churn, on account of its simplicity and cheapness of manufacture, will form a useful household article for small farmers and others, so as to enable them to make a product equal to that of the best-regulated creameries.

Having thus described my invention, what I claim as new, and desire to secure by Letters Patent, is—

1. In a churn, the combination, with a base, of a spring-plate secured at one end to the said base, a support held on the free end of the said spring-plate, and a transversely-extending dovetailed groove, and a vessel provided on its under side with a dovetail fitting into the said dovetailed groove, substantially as shown and described.

2. In a churn, the combination, with a base, of a spring-plate secured at one end to the said base, a support held on the free end of the said spring-plate, and a transversely-extending dovetailed groove, and a vessel provided on its under side with a dovetail fitting into the said dovetailed groove and provided with an inlet and an outlet cap, and the pins F, securing the dovetail in the groove, substantially as shown and described.

ROBERT CAMPBELL.

Witnesses:
C. L. BAILEY,
CLARA PLUMMER.